United States Patent
Waldron et al.

(10) Patent No.: US 10,560,427 B2
(45) Date of Patent: Feb. 11, 2020

(54) DOMAIN NAME OPERATION VERIFICATION CODE GENERATION AND/OR VERIFICATION

(71) Applicant: VERISIGN, INC., Reston, VA (US)

(72) Inventors: Joseph Waldron, Herndon, VA (US); Christopher Klein, Leesburg, VA (US); James Gould, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 505 days.

(21) Appl. No.: 14/868,972

(22) Filed: Sep. 29, 2015

(65) Prior Publication Data

US 2017/0093793 A1 Mar. 30, 2017

(51) Int. Cl.
*H04L 29/12* (2006.01)
(52) U.S. Cl.
CPC ...... *H04L 61/3025* (2013.01); *H04L 61/1511* (2013.01); *H04L 61/3005* (2013.01)
(58) Field of Classification Search
CPC ............... H04L 61/302; H04L 61/3025; H04L 61/1511; H04L 61/3005
See application file for complete search history.

(56) References Cited

U.S. PATENT DOCUMENTS

| | | | |
|---|---|---|---|
| 7,194,552 B1 | 3/2007 | Schneider | |
| 7,761,583 B2 * | 7/2010 | Shull | H04L 29/12066 709/225 |
| 7,844,729 B1 | 11/2010 | Friedman et al. | |
| 7,953,813 B2 * | 5/2011 | Ruiz | G06Q 30/0217 709/206 |
| 8,904,519 B2 * | 12/2014 | Essawi | H04L 9/3226 726/20 |
| 9,015,826 B2 * | 4/2015 | Park | G06F 21/44 380/277 |
| 2004/0167982 A1 | 8/2004 | Cohen et al. | |
| 2006/0184443 A1 * | 8/2006 | Erez | G06Q 30/08 705/37 |
| 2007/0130284 A1 | 6/2007 | Stahura | |
| 2009/0165116 A1 | 6/2009 | Morris | |
| 2010/0325723 A1 * | 12/2010 | Essawi | H04L 9/3226 726/20 |
| 2012/0174198 A1 * | 7/2012 | Gould | H04L 63/0807 726/6 |
| 2013/0254300 A1 * | 9/2013 | Berk | H04L 51/28 709/206 |

(Continued)

OTHER PUBLICATIONS

Extended European Search Report dated Mar. 2, 2017, European Application No. 16191255.5, pp. 1-7.

(Continued)

*Primary Examiner* — Uzma Alam
(74) *Attorney, Agent, or Firm* — MH2 Technology Law Group, LLP

(57) ABSTRACT

System, apparatus, methods, and computer-readable medium for generating a verification code related to a registry operation request are provided. A verification process may be performed to determine if a verification request related to a registry operation is to be approved. If the request is to be approved, a verification code is generated that includes identifying information of a verification service provider and a code indicating that the request has been verified.

18 Claims, 9 Drawing Sheets

(56) References Cited

U.S. PATENT DOCUMENTS

| | | | |
|---|---|---|---|
| 2014/0115341 A1* | 4/2014 | Robertson | H04L 9/3228 713/183 |
| 2014/0230038 A1* | 8/2014 | Leong | H04L 9/3215 726/7 |
| 2014/0304412 A1 | 10/2014 | Prakash et al. | |
| 2015/0033293 A1* | 1/2015 | Nishida | G06F 21/608 726/4 |
| 2015/0350887 A1* | 12/2015 | Huai | H04W 4/90 455/404.1 |
| 2016/0005051 A1* | 1/2016 | Taylor | G06K 9/00154 705/318 |
| 2016/0140159 A1* | 5/2016 | Gupta | G06F 16/23 707/609 |
| 2016/0182490 A1 | 6/2016 | Gupta et al. | |
| 2016/0182562 A1* | 6/2016 | Gupta | H04L 9/0861 726/6 |
| 2016/0248752 A1* | 8/2016 | Blinn | H04L 63/083 |
| 2017/0195286 A1 | 7/2017 | Stahura et al. | |
| 2018/0063078 A1 | 3/2018 | Gould et al. | |

OTHER PUBLICATIONS

PTO Non-Final Office Action dated Sep. 26, 2018, U.S. Appl. No. 15/251,339, pp. 1-51.

Tipsforyourwebsite, "Expired domains—serverHold, serverUpdateProhibited—what does it mean?" Apr. 5, 2016, Retrieved from the Internet: https://www.tipsforyourwebsite.com/expired-domains-serverhold-serverupdateprohibited-what-does-it-mean/, pp. 1-4.

The Internet Infrastructure Foundation (.SE), "Procedure description Registration Services", Sep. 14, 2012, Retrieved from the Internet: https://www.iis.se/docs/SE_Routine_descriptions.pdf, pp. 1-36.

ARI Registry Services, "Domain Name Lifecycle Policy", Nov. 10, 2014, Retrieved from the Internet: https://nic.melbourne/wp-content/uploads/2014/07/10-Domain-Name-Lifecycle-Policy.pdf.pdf, pp. 1-20.

Open SRS, "Reseller's Guide to Domain Name Registration and Management", Jan. 7, 2014, Retrieved from the Internet: https://www.opensrs.com/docs/opensrs_rwi.pdf, pp. 1-282.

L. Zhou et al., "Registry Reseller Extension for the Extensible Provisioning Protocol (EPP)", May 4, 2015, Retrieved from the Internet: ftp://ftp.apnic.net/public/ietf-mirror/draft-zhou-eppext-reseller-00.txt, pp. 1-14.

ILAIT, "Domain Registration Agreement", Oct. 23, 2011, Retrieved from the Internet: https://web.archive.org/web/20111023201455/https://ilait.com/legal/domain-registration-agreement, pp. 1-4.

PTO Non-Final Office Action dated Feb. 27, 2018, U.S. Appl. No. 15/251,339, pp. 1-54.

* cited by examiner

DOMAIN NAME OPERATION VERIFICATION CODE GENERATION AND/OR VERIFICATION

BACKGROUND

As Internet usage grows exponentially, the demand for Internet-related services is also growing rapidly. As a result of the increased usage of the Internet, the demand for domain names is also growing rapidly. Consequently, demand for domain related services is also on the rise. Such domain related services can include domain name creation, domain name registration renewal, etc. Typically, a website serves as a primary vehicle for establishing an online presence for a domain name. To meet this ever increasing demand for domain name related services, entities that provide these services should do so in an efficient and cost effective manner.

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "corn"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com.

The responsibility for operating each TLD, including maintaining a registry of the second-level domains within the TLD, is delegated to a particular organization, known as a domain name registry ("registry"). The registry is primarily responsible for answering queries for IP addresses associated with domains ("resolving"), typically through DNS servers that maintain such information in large databases, and operating its top-level domain.

For most TLDs, in order to obtain a domain name, that domain name has to be registered with a registry through a domain name registrar, an entity authorized to register Internet domain names on behalf end-users. Alternatively, an end-user can register a domain name indirectly through one or more layers of resellers. A registry may receive registrations from hundreds of registrars.

A registrar usually has a dedicated service connection with the registries in order to access domain related services, e.g., domain name creation or renewal. Registrars typically use the Extensible Provisioning Protocol ("EPP") as a vehicle to communicate with the registries in order to register or renew domain names. EPP is a protocol designed for allocating objects within registries over the Internet. The EPP protocol is based on Extensible Markup Language ("XML"), which is a structured, text-based format. The underlying network transport is not fixed, although the currently specified method is over Transmission Control Protocol ("TCP").

Localities may require domain name registries to comply with the local compliance and verification policies to operate registry services of TLDs and below within the respective locality. This brings a number of challenges to operate a domain registry service for a TLD or below residing outside of the locality. For example, in order to comply with a locality's verification process, data that may be needed to perform verification, for example, of a registrant, a domain name, etc., may be only accessible within the locality. Further, to create a direct dependency to the locality's data may be a security concern for the locality.

SUMMARY OF THE DISCLOSURE

Consistent with some examples of the present disclosure, there is provided computer-implemented methods, apparatus, and non-transitory computer readable storage media storing a set of instructions to receive a verification request from a registrar device at a verification service provider device, the verification request relating to a domain name operation relating to a domain name, registrant identification information identifying a registrant of the domain name, or both the domain name and the registrant identification information, performing a verification process in response to receiving the verification request, and determining whether the verification request is approved based on the verification process. A verification code including identifying information of the verification service provider and information identifying that the verification process has been approved may be generated based on a determination that the verification is approved.

Consistent with other examples of the present disclosure, there is provided computer-implemented methods, apparatus and non-transitory computer readable media storing a set of instructions to transmit a request for verification relating to a domain name operation to a verification service provider device, the request related to a domain name, registrant information identifying a registrant of the domain name, or both the domain name and the registrant information, and receiving from the verification service provider, in response to the request for verification, a verification code indicating that the domain name, the registrant of the domain name, or both the domain name and the registrant is verified.

Consistent with other examples of the present disclosure, there is provided computer-implemented methods, apparatus, and non-transitory computer-readable media storing a set of instructions to receive a request at a registry device from a registrar device, the request including a verification code, processing the verification, determining whether the request is a valid request based on the processing of the verification code, and performing the request.

Consistent with other examples of the present disclosure, there is provided computer-implemented methods, apparatus, and non-transitory computer-readable media storing a set of instructions to access a set of objects, each object in the set of objects having a compliance status; determine a set of registrars for each of a plurality of profiles; for each registrar in the set of registrars, access a subset of objects of the set of objects; for each object in the subset of objects, determine a compliance status; and perform an action on at least one of the objects in the subset of objects based on the determining of the compliance status.

Before explaining at least one embodiment of the disclosure in detail, it is to be understood that the disclosure is not limited in its application to the details of construction and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

DETAILED DESCRIPTION

Reference will now be made in detail to the present embodiments of the disclosure, certain examples of which are illustrated in the accompanying drawings.

As discussed herein, different localities have different requirements that must be followed when registries operate registry services of a TLD or below within the locality. Further, in certain localities, there may requirements that information regarding a registrant, or other information that is used in order to facilitate performance of registry operations, must remain within the locality. This makes it difficult in certain localities to offer a full array of registry services without having a registry device physically located within the locality.

In order to provide an efficient system that enables registries to comply with the requirements of a locality and to ensure that information used to perform registry services remains within a locality, a verification service provider is provided within a locality in a system environment. The verification service provider is responsible for complying with the requirements of the locality in which the verification service is a part of and for verifying services to be performed by registries, where the registries may not be located within the locality of the verification service provider.

Figure 1:
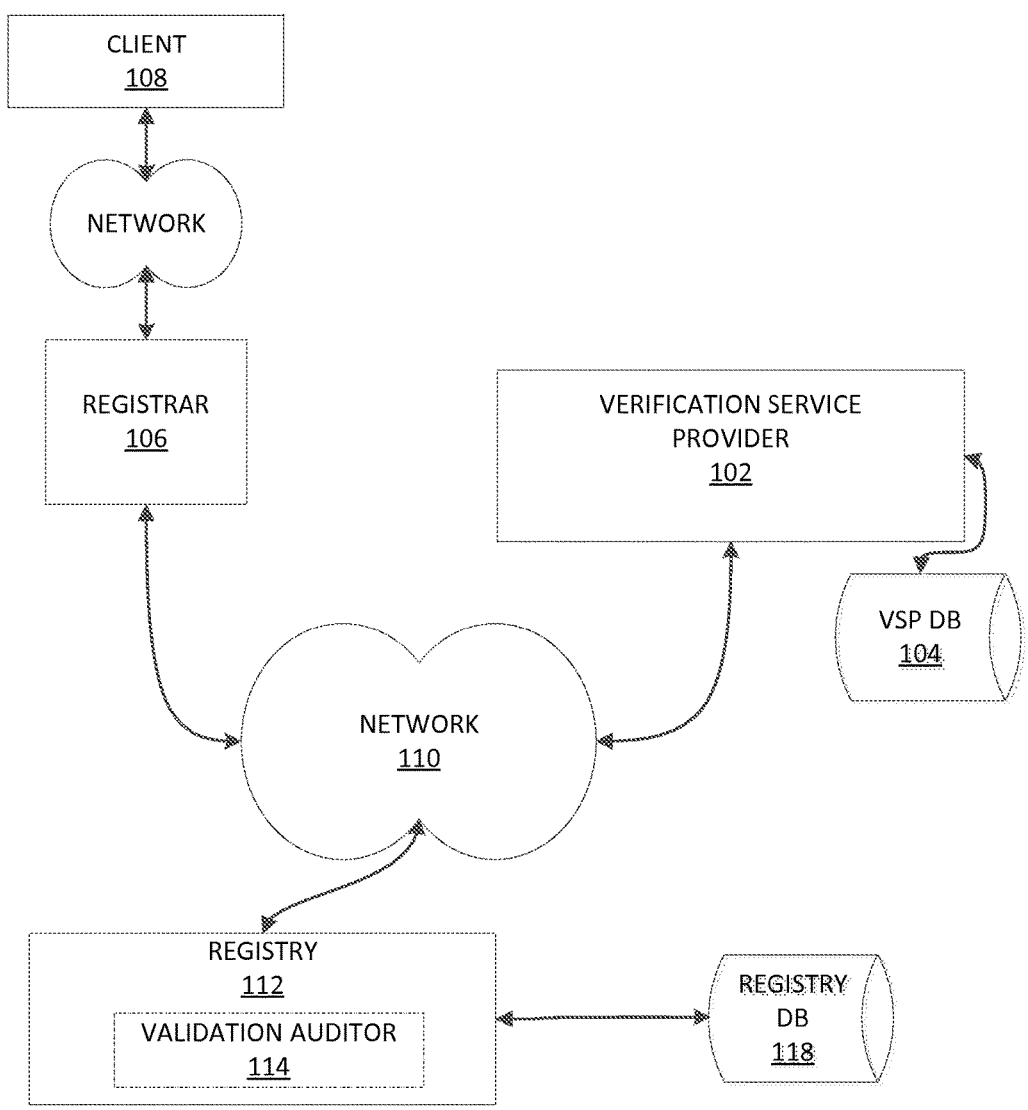
FIG. 1 illustrates a system environment, in accordance with some examples of the present disclosure.

A system 100 according to one or more examples is shown in FIG. 1. System 100 may include a verification service provider device 102 that performs registry services and receives and processes verification requests relating to domain name operations, i.e., registry services, that are to be performed by registries. As discussed herein, verification requests related to domain name operations may include operations on domains, for example, creating, changing, or deleting a domain name registration, operations on a host, for example, a device that hosts the domain, and/or operations on a contact, for example, a registrant or owner of a domain name. Verification service provider 102 may be communicably linked to verification service provider database 104 that stores information for performing the verification process, as more fully discussed below. Although only one verification service provider 102 is depicted in FIG. 1, multiple verification service providers may operate within system environment 100 and perform verification processes as discussed herein.

System 100 further may further include a registrar device 106 that receives requests from a client device 108 to facilitate performance of registry operations. The registrar device 106 is communicably linked, for example via one or more networks 110 to the verification service provider device 102 and to registry device 112. Although only one registrar device 106 is depicted in FIG. 1, multiple registrars may operate within system environment 100 and perform registrar processes as discussed herein.

System 100 further includes registry device 112 that maintains a registry for one or more TLDs and below. Registry device 112 includes a validation auditor 114 for performing validation processes as more fully discussed below. The registry device 112 may be communicably linked to database 118 that stores information for performing registry operations and/or validation audit processes as more fully discussed below. Although only one registry device 112, and one registry database 118 are depicted in FIG. 1, multiple registry devices and registry databases 118 may operate within system environment 100 and perform registry processes as discussed herein.

Each of verification service provider device 102, registrar device 106, client device 108 and registry device 112 may be implemented as a server, mainframe computing device, any combination of these components, or any other appropriate computing device, and/or resource service, for example, cloud, etc. Network 110 may include one or more direct communication links, local area networks (LANs), wide area networks (WANs), or any other suitable connections. Network 110 may also include the Internet.

As discussed herein, each of the verification service provider device 102, the registrar device 106, the client device 108 and the registry device 112 may include one or more applications implemented on the computing devices where each of the devices includes one or more processors (not shown) coupled to memory (not shown) facilitate or perform registry operations. The processors may include, e.g., a general purpose microprocessor such as the Pentium processor manufactured by Intel Corporation of Santa Clara, Calif., an application specific integrated circuit that embodies at least part of the method in accordance with certain examples in its hardware and firmware, a mobile device processor, a combination thereof, etc. The memory may be any device capable of storing electronic information, such as RAM, flash memory, a hard disk, an internal or external database, etc. The memory can be implemented as a non-transitory storage medium to store instructions adapted to be executed by the processor(s) to perform at least part of the method in accordance with certain embodiments. For example, the memory can store computer program instructions, for example, computer-readable or machine-readable instructions, adapted to be executed on the processor(s), to facilitate or perform registry operations in addition to other functionality discussed herein.

In the example shown in FIG. 1, the registrar device 106, the client device 108 and the verification service provider 102 are located within one locality while the registry device 112 may be located in a locality that is different than the locality of the registrar device 106 and the verification service provider device 102. Further, only one of each of the devices is depicted in FIG. 1. In other examples, while still maintaining the functionality discussed herein, additional client devices and registrar devices may be provided in system environment 100 within the same locality of the registrar device 106, additional verification service providers 102 may be provided within the same locality, and/or other devices not shown may be provided in system environment 100. Further, one or more other localities may be provided wherein one or more client devices, one or more registrars, and one or more verification service providers may be provided within system environment 100.

As discussed herein, a locality may be a geographic region, or other delineation where a set of requirements is established to perform one or more registry operations. The set of requirements may be associated with a profile for that locality and stored within system environment 100 as more fully discussed below. For example, a locality may be implemented as a country, a province, state, city, town, or any geographic region that has attributed to it a set of requirements, etc. Alternatively, one or more business entities may be identified as a locality such that the one or more business entities may have associated therewith a profile including a set of requirements. Alternatively, the localities maybe hierarchical such that multiple profiles may be used to identify requirements that are to be met in order to perform one or more registry operations. For example, where a city has a set of requirements and a state in which the city is located has its own set of requirements, in order to perform a registry operation, the requirements for both the city and state are utilized as discussed herein.

Figure 2:
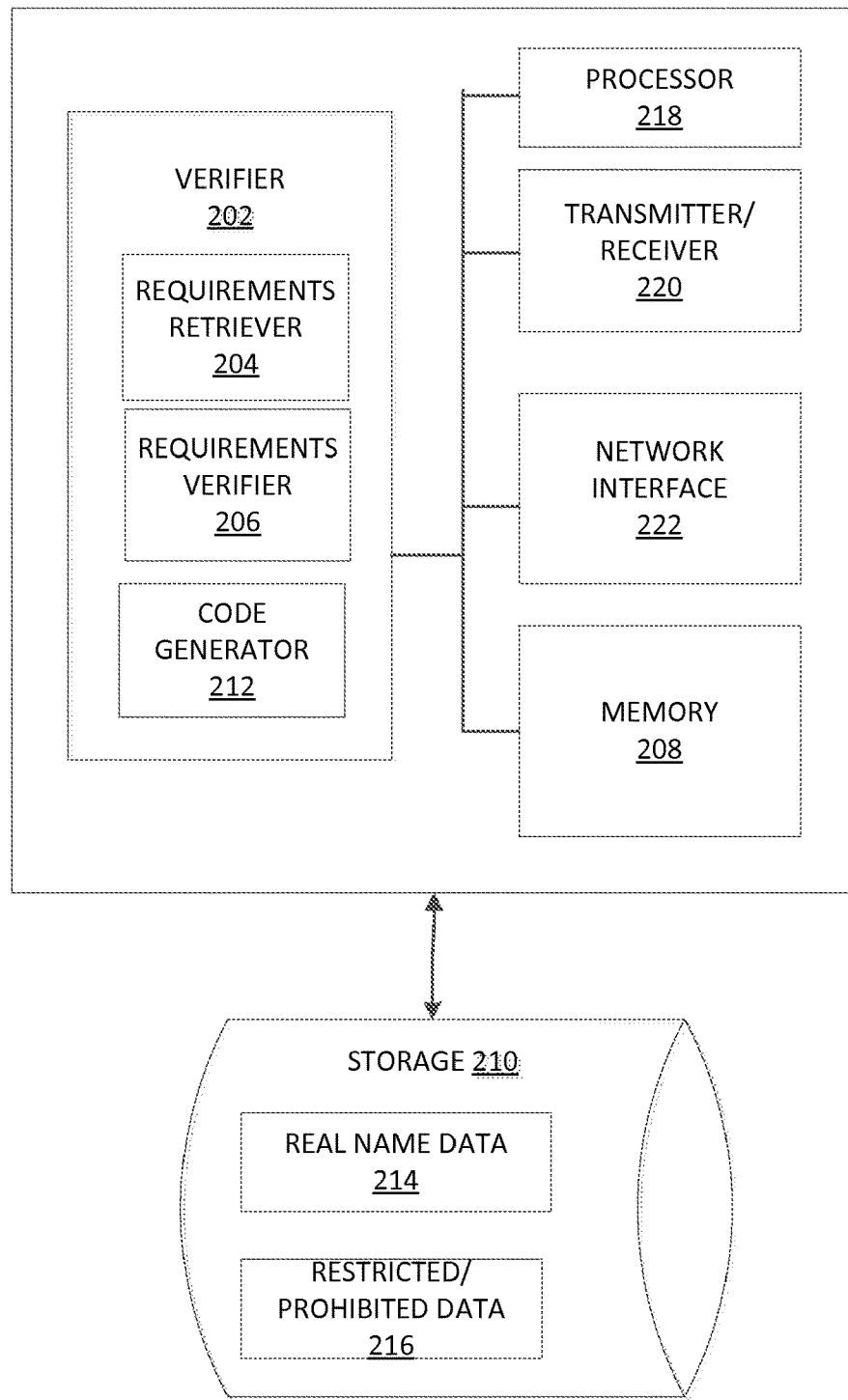
FIG. 2 illustrates an example verification service provider device, in accordance with some examples of the present disclosure.

FIG. 2. Illustrates some components of a verification service provider device 200 for performing a verification process for the locality in which the verification service provider is a part of. Verification service provider device 200 may be implemented as, for example, verification service provider device 102 in FIG. 1. According to some examples, multiple verification service provider devices may process a single verification request such as micro-verifications with different verification input resulting in separate verification codes being generated. Further, according to some examples, a single verification service provider may perform multiple verifications based on a verification request and produce one or more verification codes.

As shown in FIG. 2, verification service provider device 200 may include a verifier 202 for performing a verification process. The verifier 202 may include requirements retriever 204. Upon receipt of a verification request from, for example, a registrar device such as the registrar device 106 in FIG. 1, the requirements retriever 204 may retrieve, from a memory, for example, memory 208 or database 210, one or more requirements that may be associated with a registry operation that is in the verification request. For example, device 200 may store, in memory 208, database 210, or elsewhere within system environment 100, a set of requirements that are associated with registry operations. The set of requirements may be accessed and used as discussed herein during the verification process. The set of requirements accessed by the verification service provider are requirements that may be set by the locality in which the verification service provider is a member of. The set of requirements includes the requirements that must be satisfied in order for the verification service provider to generate and provide to a registrar a verification code. Thus, the set of requirements that are accessed and used by the verification service provider are associated with the locality in which the verification service provider is a member of.

The verifier 202 may further include requirements verifier 206 for verifying whether the retrieved one or more requirements are met based on data that is stored in, for example, memory 208 or database 210. The verifier 202 may be implemented as software in the form of a set of machine-readable program instructions, executable by a processor, firmware, or hardware, or a combination thereof. For example, in a domain name create operation, the set of requirements may include a domain name verification requirement that may include determining if the domain name is a valid name, for example, it is not prohibited or restricted in any way, and a real name verification that may include verifying the identify of the registrant of the domain name. Further, requirements verifier 206 may compare the requested domain name included in the verification request with the domain names included in the restricted/prohibited data 216 stored in database 210. In another example, for a real name verification, once the requirements retriever 204 retrieves these requirements, the requirements verifier 206 may use a set of real name data 214 stored in database 210 to verify the identity of the registrant. The requirements verifier 206 may determine if the identify of the registrant can be verified and if the requested domain name can be verified. Other requirements may include verifying that a registrant has control of a name server, that a technical contact is an authentic person, etc. The requirements verifier 206 may output an indication whether the requirements have been met or not.

The verifier 202 may include code generator 212 for generating a verification code. If the requirements verifier 206 determines that the requirements associated with the registry operations have been met, or verified, the code generator 212 may generate a code.

The following is an example of the algorithm used by the code generator 212 to generate a verification code:

```
<verificationCode:signedCode
  xmlns:verificationCode=
  "urn:ietf:params:xml:ns:verificationCode1.0"
  id="signedCode">
  <verificationCode:code>1abc123</
  verificationCode:code>
  <Signature xmlns="http://www.w3.org/2000/09/xmldsig#">
    <SignedInfo>
      <CanonicalizationMethod
Algorithm="http://www.w3.org/2001/10/xmlexcc14n#"/>
      <SignatureMethod
Algorithm="http://www.w3.org/2001/04/xmldsigmore#rsasha256"/>
      <Reference URI="#signedCode">
        <Transforms>
          <Transform
Algorithm="http://www.w3.org/2000/09/xmldsig#envelopedsignature"/>
        </Transforms>
        <DigestMethod
```

```
Algorithm="http://www.w3.org/2001/04/xmlenc#sha256"/>
<DigestValue>wgyW3nZPoEfpptlhRILKnOQnbdtU6ArM7ShrAfHgDFg=
</DigestValue>
    </Reference>
  </Signed Info>
  <SignatureValue>
```

As can be seen from the above, the verification code includes identifying information that may be used to identify the verification service provider device that that generated the verification code. This may be used during a verification code validation process as more fully discussed below. Further, the verification code may include a verification code that indicates that the requirements for the requested registry operation have been met, and thus verified.

It may be appreciated that the verification code may optionally include a "type" attribute for use in generating a typed signed code. A typed signed code is a digitally signed verification code that includes a type attribute. A type attribute may identify the information that is being verified. For example, a type attribute may include a "domain" attribute value for verification of the domain name, "registrant" for verification of the registrant, "domain-registrant" for the verification of the domain name, the registrant, etc. thereby indicating what the verification code has verified.

The code generator 212 may further digitally sign the generated verification code, for example, using an extensible markup language (XML) signature. The code generator 212 may be implemented as software in the form of a set of machine-readable program instructions, executable by a processor, firmware, or hardware, or a combination thereof. The verification code may not include any other information related to the verification request that was used to verify if the requirements associated with the registry operation have been met. In other words, in response to the registrant's verification request, only the verification code including the information noted above may be generated and transmitted by the verification service provider device in response to the verification request by the registrant device. This ensures that the data that is located within the locality of the verification service provider device does not leave the locality, but, instead, remains securely within the locality.

The verification request, including registrar identifying information, the input used to process the verification request, and the result of the verification process, which may include the verification code may be associated together and stored in memory 208, database 210, or another data storage within system environment 100, but within the locality of the verification service provider. This information may be accessed at a later time for auditing purposes in order to determine whether the verification service provider and/or the registrar is conforming to the set of requirements for the locality.

Further, by providing the verification service provider 200 within the locality, the verification service provider device may monitor, via an application at verification service provider device 200 not shown, requirements that are associated with registry operations and update the requirements at the verification service provider device 200 accordingly.

Verification service provider device 200 may further include processor 218 to execute machine-readable code in the form of program instructions stored in a memory 208 to perform methods and processes as discussed herein. Verification service provider device 200 may further include a transmitter/receiver 220 to transmit and receive data from other devices, such as registrar device 106, etc., within system environment 100. Verification service provider device 200 may further include network interface 222 to facilitate communication with other devices within system environment 100.

Figure 3:
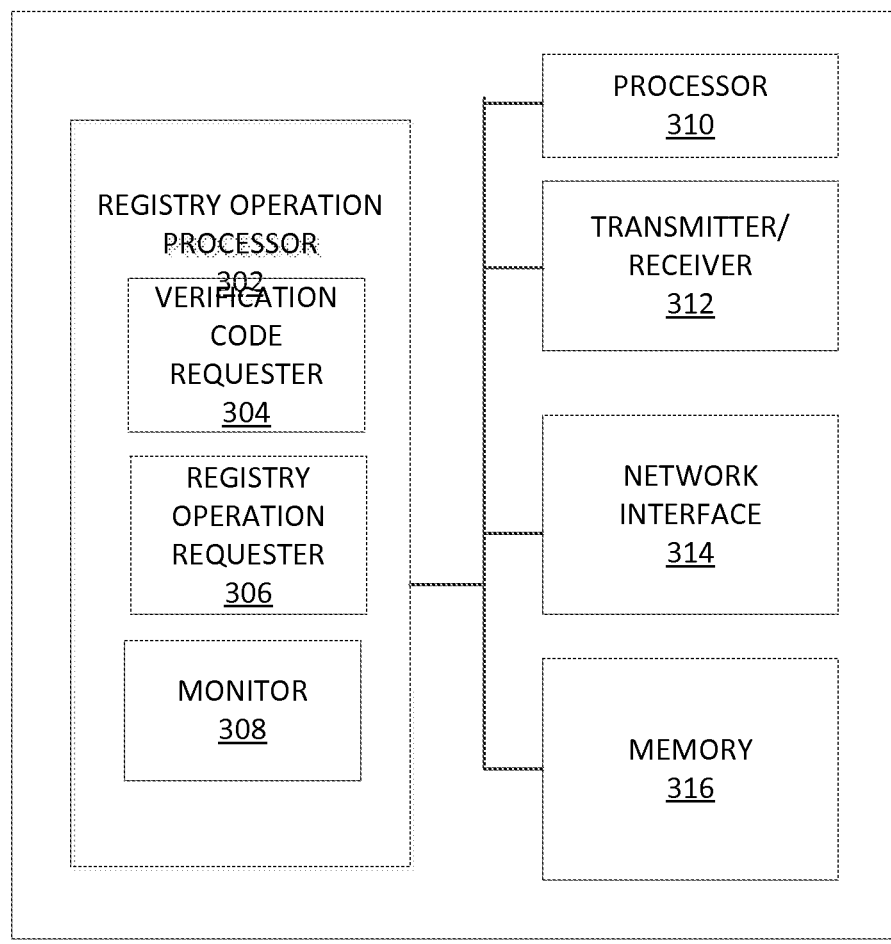
FIG. 3 illustrates an example registrar device, in accordance with some examples of the present disclosure.

FIG. 3 illustrates some components of a registrar device 300 for facilitating a registry operation. Registrar device 300 may be implemented as, for example, registrar device 106 in FIG. 1. As shown in FIG. 3, registrar device 300 may include a registry operation processor 302 for facilitating registry operations. The registry operation processor 302 may be implemented as software in the form of a set of machine-readable program instructions, executable by a processor, firmware, or hardware, or a combination thereof. Registry operation processor 302 may include verification code requester 304. The verification code requester 304 may be implemented as software in the form of a set of machine-readable program instructions, executable by a processor, firmware, or hardware, or a combination thereof. Upon receiving a request to perform a registry operation from a client device, for example, client device 108 being operated by a registrant, verification code requester 304 may generate and transmit a request to the verification service provider device. The request may include information for facilitating the request, for example, one or more of the registrant name, other registrant identifying information, registrar identifying information, a domain name, other type of information that may be used to facilitate the verification process, etc.

The registry operation processor 302 may receive a response to the request for a verification code. If the verification request was denied, or failed, by the verification service provider device, the registry operation processor 302 may generate and transmit a response to the client device that sent the request to perform the registry operation indicating that the request was denied.

If a verification code was received from the verification service provider indicating that the requirements needed for the verification process were met, then the registry operation requester 306 may generate a request to the registry device to perform the client device's request to perform the registry operation. The request to the registry device includes the verification code that was provided by the verification service provider. However, the request does not include information that was accessed by the verification service provider device, as the information used by the verification service provider device to perform the verification process was not transmitted to the registrar device 300. Thus, the information used by the verification service provider device remains secure.

It may be appreciated that some of the requirements may be fulfilled after an initial request to the registry device is transmitted. Registrar device 300 may include a monitor 308 that may monitor pending requests and facilitate obtaining additional information/verification/etc., in order to facilitate completion of registry operation requests.

Registrar device 300 may further include processor 310 to execute machine-readable code in the form of program instructions stored in a memory 316 to perform methods and processes as discussed herein. Registrar device 300 may further include a transmitter/receiver 312 to transmit and receive data from other devices, such as verification service provider device 102, registry device 112, etc., within system environment 100. Registrar device 300 may further include network interface 314 to facilitate communication with other devices within system environment 100.

The verification request, the input used to process the verification request, and the result of the verification process, which may include the verification code may be associated together and stored in memory 316 or another data storage within system environment 100, but within the locality of the registrar. This information may be accessed at a later time for auditing purposes in order to determine whether the verification service provider and/or the registrar is conforming to the set of requirements for the locality.

Figure 4:
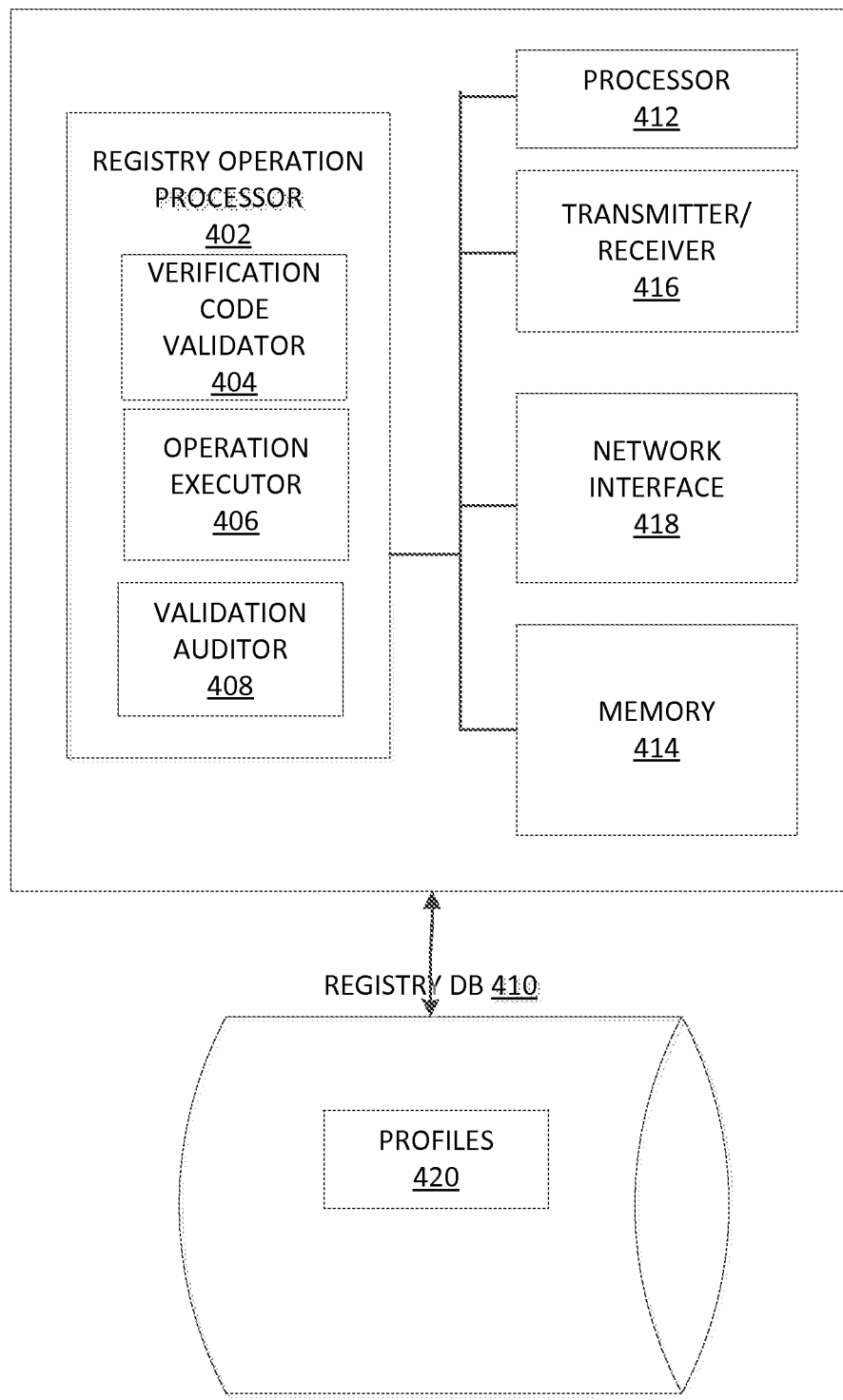
FIG. 4 illustrates an example registry device, in accordance with some examples of the present disclosure.

FIG. 4 illustrates some components of a registry device for performing a registry operation. Registry device 400 may be implemented as, for example, registry device 112 depicted in FIG. 1. As shown in FIG. 4, registry device 400 may include registry operation processor 402 for processing registry operation requests received from a registrar device. The registry operation processor 402 may be implemented as software in the form of a set of machine-readable program instructions, executable by a processor, firmware, or hardware, or a combination thereof.

Registry operation processor 402 may include a verification code validator 404 for determining whether the verification code that was included in a request to perform a registry operation is a valid verification code. The verification code validator 404 may be implemented as software in the form of a set of machine-readable program instructions, executable by a processor, firmware, or hardware, or a combination thereof. Registry database 420 may include profiles 420. Profiles 420 may store a set of profiles. Each profile may have associated therewith a set of requirements that are required for a particular registry operation for a particular locality. According to some examples, each registrar and/or registrar device may be associated with one or more profiles for registry operations that designate the requirements for the locality in which the registrar and/or registrar device is located in. Each of the requirements in each of the profiles may have associated therewith an indicator whether a verification code is "required", "supported", or "not supported." Thus, in order for a registry operation to be performed by a registry, all of the requirements in all of the profiles which are associated with a registrar requesting the registry operation must be met. While FIG. 4 depicts profiles 420 being stored in registry database 410, profiles 420 may be stored in memory 414 or in another data storage within system environment 100.

The verification code validator 404 may perform one or more of the following in determining whether the verification code is a valid verification code:
  determine if the identifying information in the verification code that identifies the verification service provider device identifies a verification service provider that is authorized to issue a verification code;
  determine if the format of the verification code is in a proper format;
  determine if the correct information is included in the verification code;
  determine if the verification code is corrupted in any way;
  etc.

In determining whether the correct information is included in the verification code, the verification code validator 404 may compare the information received in the verification code with the set of requirements associated with the profile for the registrar that requested the registry operation. If the verification code includes information that is "not supported", then the request by the registrar device may be rejected and the registry operation may not be performed. If the verification code does not include information that is required, then the request from the registrar device may be rejected. If the verification code includes the required information, but does not include information that is "supported", then the registry operation is not performed at this time and the registry operation request may be stored for a period of time to receive the additional required information. For example, a requirement may be stored as an object with a compliance status indicator. A compliant status indicator may indicate that the object is compliant to the locality profile. A pending compliance status indicator may indicate that the object is not compliant by has a time, or grace period, in which the requirement set of verification codes may be sent before the object becomes non-compliant. A non-compliant status indicator may indicate that the object is not compliant according to the locality profile. These status indicators may be used during the auditing process more fully discussed below.

When a registry operation request is stored, any objects associated with the registry operation request are stored and a validation auditor 408 monitors, or audits, the objects to determine if the object(s) are compliant. The audit of the objects is performed with an audit of all stored objects as more fully discussed below. The validation auditor 408 may be implemented as software in the form of a set of machine-readable program instructions, executable by a processor, firmware, or hardware, or a combination thereof.

For example, the validation auditor 408 may audit the stored objects by auditing the state of all object's domains based on the policy defined, in order to determine if the requirements for requested registry operations have been fulfilled within the set time period. For example, the validation auditor may access a current state of the stored objects in order to determine if the object is compliant or non-compliant. If the requirements have been met, i.e., the state or status of the one or more objects associated with the request are compliant, and therefore the registrar has provided all necessary information to complete the registry request, then the validation auditor 408 may request the registry operation processor 402 perform the requested registry operation. If the requirements have not been met, i.e., the state of the one or more objects associated with the request are non-compliant and therefore the registrar as not provided all necessary information to complete the registry request, and any time period that may be imposed on the object has not expired, then the registry operation will not yet be performed and the auditor may perform a further audit at a later time in order to determine if the object has become compliant. If the object is non-compliant, and a time period that has been imposed on the object has expired, the validation auditor 408 may perform an action including setting a status identifier of the object to non-compliant, set a server hold status, and/or pass the non-compliant status of the object to the registry operation processor for further actions to be performed including transmitting a request to the registry operation processor 402 to reject the request associated with the object to perform the registry operation requested by the registrar device.

According to some examples, the validation auditor 408 may perform an audit process periodically, according to a schedule, on demand via manual instruction, etc. During an audit process, the validation auditor 408 may access all of the stored objects of the registrar's request. For each profile, a list of registrars associated with the profile may be determined. For each verification code type in the profile for each registrar, it is determined whether the requirements associated with the profile have been met, for example, if the object is "DOMAIN", it is determined if, for each domain record that doesn't have a domain verification code with a matching verification code type id indicating that the domain has been verified, it is determined if it is required and if the grace period has expired. As another example, if the object is "NAMESERVER", it is determined if, for each name server record that doesn't have a nameserver verification code with a matching verification code type id indicating that the nameserver has been verified, it is determined if it is required and if the grace period has expired. As another example, if the object is "CONTACT", it is determined if, for each contact record that doesn't have a contact verification code with a matching verification code type id indicating that the contact has been verified, it is determined if it is required and if the grace period has expired.

If the verification code for the typed object is not received, and the grace period has not expired, then the registry operation is not performed at this time and the record may be audited at a later time. However, if the grace period has expired, then the registry operation may not be performed and other actions may be performed. For example, performing a policy action such as updating a status of a domain associated with the non-compliant object for example, adding a server hold status on a domain name thereby removing it from DNS, adding the request associated with the non-compliant object to a non-compliance report, generating and sending a transmission to the registrar that requested the registry operation associated with the non-compliant object indicating that the object(s) is not compliant, why they are not compliant, and that action has not been taken by the registry, etc. In another example, existing domains may be required to have verification codes set that were created prior to the definition of the verification policy. In this case, the validation auditor may take action based on the verification policy of the profile, i.e., require that all domains must have the codes set by their anniversary date (created date, month, and day of the year or the following year) or by a pre-specified date.

The verification code, in association with the request to perform a registry operation, and the result of the request, i.e., whether the request was approved or rejected, may be stored in database 420 and accessed at a later time in order to track which verification service provider verified a request related to a registry operation.

Registry operation processor 402 may further include operation executer 406. The operation executor 406 may be implemented as software in the form of a set of machine-readable program instructions, executable by a processor, firmware, or hardware, or a combination thereof. The operation executor 406 may execute the requested registry operations once it is determined that the requested operation has been properly verified by an authorized verification service provider, and that the set of requirements associated with a profile associated with the registrar that requested the operation has been satisfied.

Registry device 400 may further include a processor 412 to execute machine-readable code in the form of program instructions stored in a memory 414 to perform methods and processes as discussed herein. Registry device 400 may further include a transmitter/receiver 416 to transmit and receive data from other devices, such as registrar device 106, etc., within system environment 100. Registry device 400 may further include a network interface 418 to facilitate communication with other devices within system environment 100.

Figure 5:
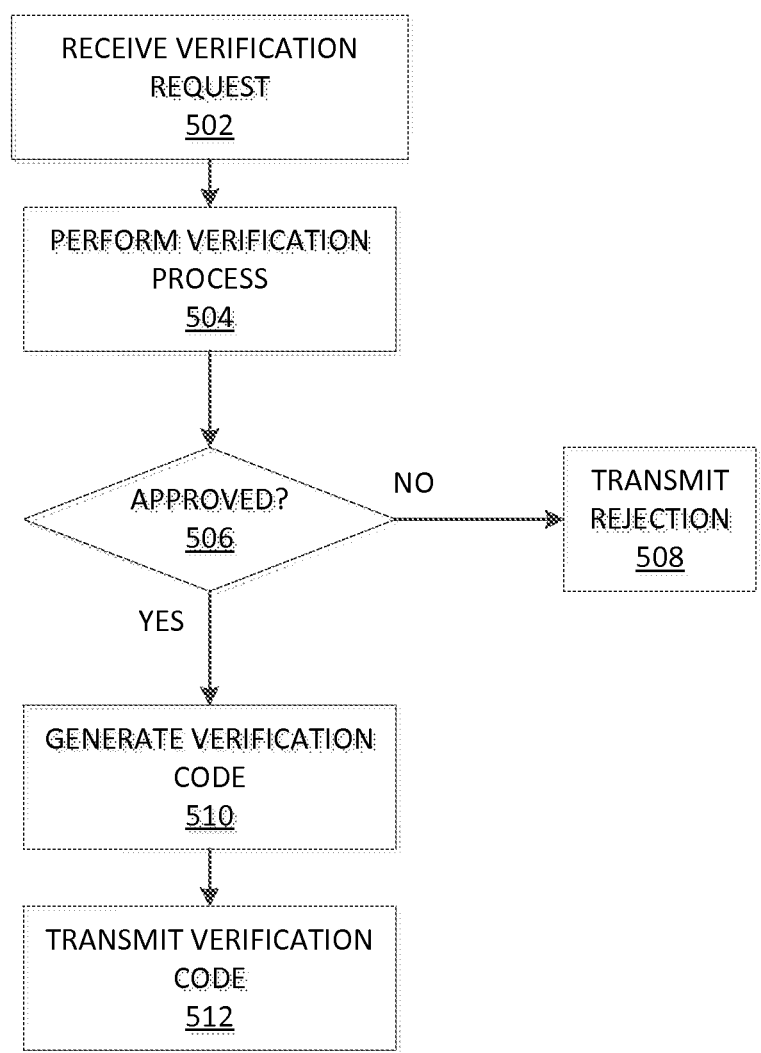
FIG. 5 illustrates an example flow diagram to generate a verification code, in accordance with some examples of the present disclosure.

FIG. 5 depicts an example flow diagram of a process for processing a verification request. The process depicted in FIG. 5 may be performed, for example, by verification service provider device 102 depicted in FIG. 1 and verification service provider device 200 depicted in FIG. 2.

As shown in FIG. 5, a verification request related to a registry operation may be received 502. The verification request may include a type of object that is to be verified, and information associated with the request including one or more of identifying information of a registrant, a domain name, and other information to facilitate the verification process.

The verification process may be performed 504. In performing the verification process, a set of requirements may be accessed in order to determine what requirements need to be satisfied in order to verify that the registry operation may be performed. According to some examples, a real name verification process may be performed to verify the identify of the registrant, a domain name verification process may be performed to determine whether the domain name is an acceptable name or if the domain name is on a restricted/prohibited list for the locality, etc. The registry operation may include a domain name registration request, a request relating to maintenance of an existing domain name registration, or another type of request relating to domain name operations.

A determination may be made to determine whether the received verification request may be approved 506. For example if one or more requirements have not been met, then the request may not be approved (506, NO). A rejection of the verification request may be transmitted 508 and processing may be completed.

If all of the requirements have been met, then the verification request may be approved (506, YES). A verification code may be generated 510. The verification code may include identifying information identifying the verification service provider device that generated and issued the verification code. The verification code may further include a code that the requirements have been met. The verification code may further be digitally signed. The generated verification code may be transmitted to the device requesting the verification 512. Additional information that may be deemed as sensitive, or secure, information may not be transmitted in response to the received verification request. Thus, the information that was used by the verification service provider device to perform the verification request may remain secure.

Figure 6:
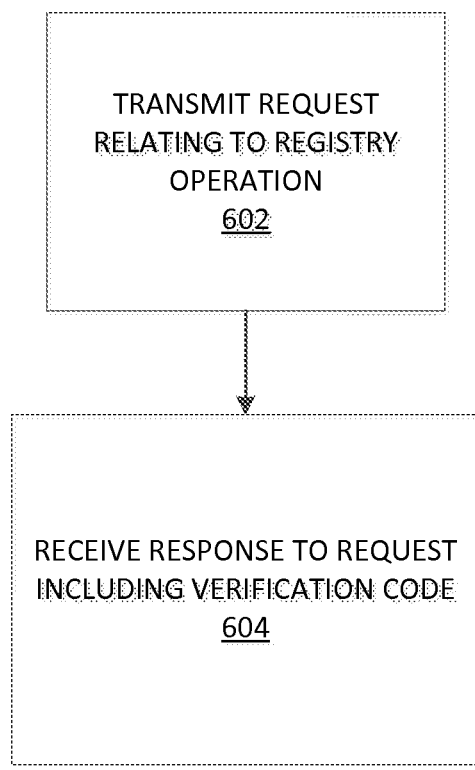
FIG. 6 illustrates an example flow diagram to request a verification code, in accordance with some examples of the present disclosure.

FIG. 6 depicts an example flow diagram of a process for requesting verification to perform a registry operation. The process depicted in FIG. 6 may be performed, for example, by registrar device 106 depicted in FIG. 1, or registrar device 300 depicted in FIG. 3. As shown in FIG. 6, a verification request to perform a registry operation may be transmitted 602. The verification request may be based on a request from a client device to perform a registry operation. The verification request that is transmitted to, for example, the verification service provider device, may include information identifying the domain name related to the request, information identifying the registrant, and other information to facilitate the verification process.

A response to the request may be received, where the response includes a verification code indicating that the verification request was approved 604. Upon receipt of the verification request, the registrar device may transmit a request, including the verification code, to the registry device in order to perform the registry operation, for example, a domain name registration, or an operation relating to the maintenance of the domain name. The registrar device and/or the registry device, may determine whether the verification code indicates that the domain name and the registrant of the domain name is verified.

Figure 7:
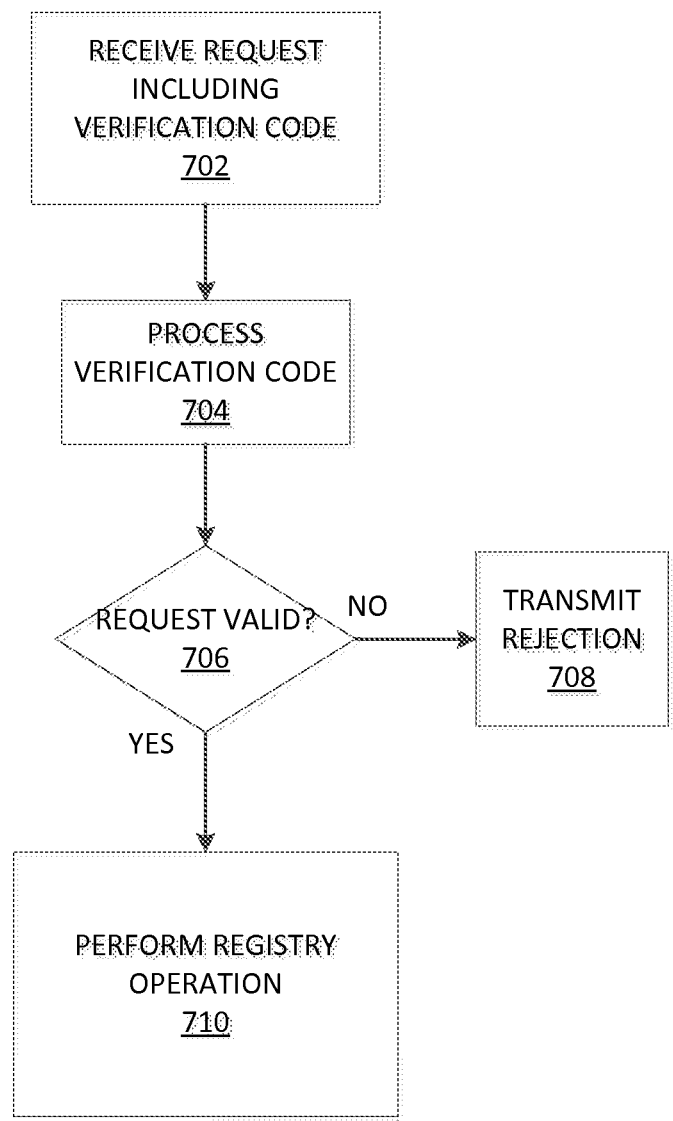
FIG. 7 illustrates an example flow diagram to perform a registry operation in accordance with some examples of the present disclosure.

FIG. 7 depicts a flow diagram of a process for performing a registry operation. The process depicted in FIG. 7 may be performed by the registry device 112 depicted in FIG. 1 or the registry device 400 depicted in FIG. 4. As shown in FIG. 7, a request, including a verification code, may be received, where the request is related to domain name operations 702. The verification code may be processed 704. For example, a profile may be determined based on the registrar that is requesting the registry operation to be performed. A set of requirements associated with the profile may be determined. The verification code may be compared with the set of requirements in order to determine whether the request is valid based on the verification code 706. If the requirements are not met (706, NO), then a rejection to the request is transmitted 708. If the requirements are met (706, YES), then the requested registry operation may be performed.

The verification code may further be processed in order to determine a verification service provider or verification service provider device from the verification code in order to determine if the verification service provide is an authorized verification service provider. If the verification service provider is not authorized to issue the verification code, the request may be rejected.

The verification code may be compared with the set of requirements in order to determine if the proper code type(s) are received thereby determining that domain name and/or the registrant associated with the request may be verified.

Figure 8:
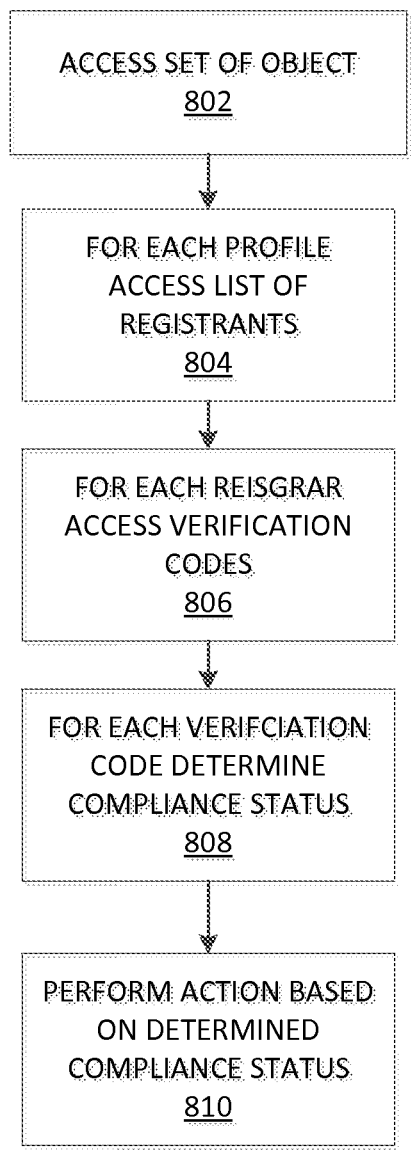
FIG. 8 illustrates an example flow diagram to perform a validation audit, in accordance with some examples of the present disclosure.

If the verification code does not satisfy all of the requirements in the set of requirements associated in the profile for the requesting registrar, and is stored as one or more objects as noted above, the validation auditor may perform one or more auditing processes on the objects as depicted in FIG. 8. As shown in FIG. 8, a set of objects for performing a registry operation may be accessed 802. As shown in FIG. 8, during an audit process, a set of objects may be accessed 802. For example, the validation auditor 408 may access all of the stored objects of the registrar's request.

For each profile, a list of registrars associated with the profile may be determined 804. For each registrar in the list of registrars, a subset of verification codes is accessed 806. For each verification code type in the profile for each registrar, the compliance status is determined 808. By determining the compliance status, it is determined whether the requirements associated with the profile have been met by determining whether the compliance status indicator is set as compliant, non-compliant, or pending. An action may be performed based on the determined compliance status 810.

According to some examples, the it may be determined if there is a grace period provided for the object. If the verification code for the typed object is not received, and the grace period has not expired, then the compliance status identifier is pending and the record may be audited at a later time. However, if the grace period has expired, then a policy action may be performed such as updating a status of a domain associated with the non-compliant object for example, adding a server hold status on a domain name thereby removing it from DNS, adding the request associated with the non-compliant object to a non-compliance report, generating and sending a transmission to the registrar that requested the registry operation associated with the non-compliant object indicating that the object(s) is not compliant, why they are not compliant, that action has not been taken by the registry, etc. In another example, existing domains may be required to have verification codes set that were created prior to the definition of the verification policy. In this case, the validation auditor may take action based on the verification policy of the profile, i.e., require that all domains must have the codes set by their anniversary date (created date, month, and day of the year or the following year) or by a pre-specified date.

The verification code, in association with the request to perform a registry operation, and the result of the request, i.e., whether the request was approved or rejected, may be stored in database 420 and accessed at a later time in order to track which verification service provider verified a request related to a registry operation.

For each object, a determination is made as to whether all of the requirements have been received thereby satisfying all of the requirements related to the registry operation 804 by analyzing the object status identifiers that indicate whether the object is compliant, pending compliance, or non-compliant. If the requirements have not been met, in that the verification codes for at least one requirement in the set of requirements has not been received as indicated by the non-compliance status identifier of the object (804, NO), then processing proceeds back to 802. If the requirements have been met, as indicated by the compliant status identifier of the object (804, YES), then the registry device performs the registry operation 806. A message may be transmitted to the requesting device, for example, the registrar device, that the request has been accepted and the registry operation has been performed, and according to some examples, the compliance status of objects associated with the registrar.

In performing the auditing process, the validation auditor may check to determine if a grace period, or time period for which the requirements were to be received, has expired. If the grace period has expired, and the requirements have not been received, then the request to perform the registry operation may not be performed. According to some examples, other actions may be performed as noted above including setting one or more statuses for objects as non-compliant.

The validation auditor looks at all objects (domains) applicable to the profile to determine if they are or are not compliant and to ensure that the appropriate action is taken for non-compliant objects and recently complaint objects, assuming that recently compliant objects are not addressed at the time of the operation. For example, a domain could be identified as non-compliant due to the lack of a realname code, which will remove it from DNS (serverHold status set) by the validation auditor. A domain update with the realname code will make it compliant either inline within the domain update or later by the validation auditor. Once the domain becomes compliant, it will be added back to DNS (serverHold status removed).

Figure 9:
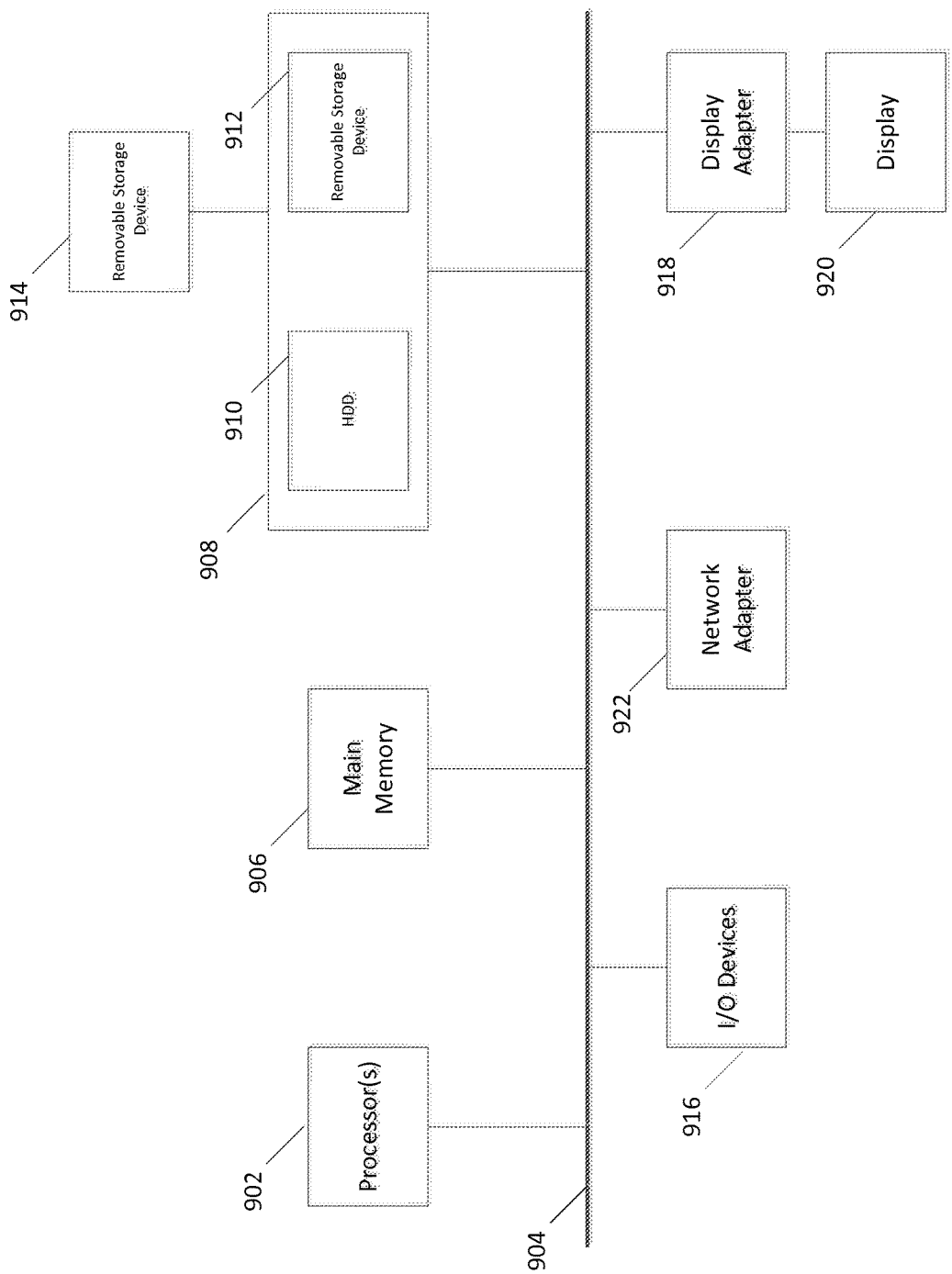
FIG. 9 illustrates an example computer system for implementing the disclosed embodiments.

FIG. 9 illustrates a block diagram of some components a computing apparatus 900, that may be implemented in the devices 102, 106, 108, and 112 depicted in FIG. 1, according to an example. In this respect, the computing apparatus 900 may be used as a platform for executing one or more of the functions described hereinabove.

The computing apparatus 500 includes one or more processors 902. The processor(s) 902 may be used to execute some or all of the steps described in the method depicted in FIGS. 5-8. Commands and data from the processor(s) 902 are communicated over a communication bus 904. The computing apparatus 900 also includes a main memory 906, such as a random access memory (RAM), where the program code for the processor(s) 902, may be executed during runtime, and a secondary memory 908. The secondary memory 908 may include, for example, one or more hard disk drives 910 and/or a removable storage drive 912, representing a floppy diskette drive, a magnetic tape drive, a compact disk drive, etc., where a copy of the program code in the form of computer-readable or machine-readable instructions for the components of the verifier 202, the registry operation processor 302, and the registry operation processor 402, etc., to execute the method depicted in FIGS. 5-8 may be stored. The storage device(s) as discussed herein may comprise a combination of non-transitory, volatile or nonvolatile memory such as random access memory (RAM) or read only memory (ROM).

The removable storage drive 910 may read from and/or writes to a removable storage unit 914 in a well-known manner. User input and output devices 916 may include a keyboard, a mouse, a display, etc. A display adaptor 918 may interface with the communication bus 904 and the display 920 and may receive display data from the processor(s) 902 and convert the display data into display commands for the display 920. In addition, the processor(s) 902 may communicate over a network, for instance, the Internet, LAN, etc., through a network adaptor 922.

The foregoing descriptions have been presented for purposes of illustration and description. They are not exhaustive and do not limit the disclosed examples to the precise form disclosed. Modifications and variations are possible in light of the above teachings or may be acquired from practicing the disclosed examples. For example, the described implementation includes software, but the disclosed examples may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other examples will be apparent to those skilled in the art from consideration of the specification and practice of the examples disclosed herein. The recitations in the claims are to be interpreted broadly based on the language employed in the claims and not limited to examples described in the present specification or during the prosecution of the application, which examples are to be construed non-exclusive. It is intended, therefore, that the specification and examples be considered as example(s) only, with a true scope and spirit being indicated by the following claims and their full scope equivalents.

The many features and advantages of the disclosure are apparent from the detailed specification, and thus, it is intended that the appended claims cover all systems and methods which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

The invention claimed is:

1. A verification service provider device, comprising:
a memory configured to store a set of instructions; and
a processor configured to execute the stored set of instructions to perform operations comprising:
receiving a verification request from a registrar device over a communications network, the verification request relating to a domain name operation for a domain name requested by a client device, registrant identification information identifying a registrant of the domain name, or both the domain name operation and the registrant identification information;
performing a verification process in response to receiving the verification request, the verification process determining that one or more requirements associated with a locality condition of a verification service provider is met, wherein the verification process determines that the domain name is a valid name and determines an identity of the registrant of the domain name;
determining that the verification request is approved based on the verification process;
generating a verification code, the verification code including identifying information of the verification service provider and information identifying that the verification request has been approved based on the determining that the verification request is approved; and
transmitting, over the communications network, the verification code to the registrar device.

2. The verification service provider device of claim 1, wherein the verification process includes performing a real name verification process in order to verify the registrant of the domain name.

3. The verification service provider device of claim 1, wherein the verification process includes performing a domain verification process in order to verify the domain name.

4. The verification service provider device of claim 1, wherein the domain name operation is a domain name registration request.

5. The verification service provider device of claim 4, wherein the domain name operation request relates to maintenance of an existing domain name registration.

6. The verification service provider device of claim 1, the operations further comprising:
digitally signing the verification code.

7. A Domain Name System (DNS) registrar device, comprising:
a memory configured to store a set of instructions; and
a processor configured to execute the stored set of instructions to perform operations comprising:
receiving, over a communications network, a request for a domain name operation from a client;
generating, by a hardware processor, a request for verification to perform the domain name operation to a verification service provider device, the request for the domain operation relating to a domain name operation for a domain name, registrant identification information identifying a registrant of the domain name, or both the domain name operation and the registrant identification information;

transmitting, over the communications network, the request for verification to the verification service provider device;

receiving, over the communications network, from the verification service provider device, in response to the request for verification, a verification code indicating that one or more requirements associated with a locality condition of a verification service provider is met, that the domain name, the registrant of the domain name, or both the domain name and the registrant of the domain name is verified, wherein the verification code comprises identifying information of the verification service provider device;

monitoring pending verification requests from the verification service provider device;

obtaining additional information to complete a registry operation request; and determining that the verification code indicates that the domain name and the registrant of the domain name is verified.

8. The DNS registrar device of claim 7, wherein the operations further comprise transmitting a registration request to a registry device, the registration request including the verification code and the domain name for registration.

9. The DNS registrar device of claim 7, further comprising:

determining whether the verification code indicates that domain name and the registrant of the domain name is verified.

10. The DNS registrar device of claim 7, wherein the request for verification includes a request for performing a domain name verification process in order to verify the domain name.

11. The DNS registrar device of claim 7, wherein the domain name operation is a domain name registration request.

12. The DNS registrar device of claim 7, wherein the domain name operation relates to maintenance of an existing domain name registration.

13. A computer-implemented method for providing a verification service, the method comprising:

receiving a verification request from a registrar device, the verification request relating to a domain name operation for a domain name requested by a client device, registrant identification information identifying a registrant of the domain name, or both the domain name operation and the registrant identification information;

performing a verification process in response to receiving the verification request, the verification process determining that one or more requirements associated with a locality condition of a verification service provider is met, wherein the verification process determines that the domain name is a valid name and determines an identity of the registrant of the domain name;

determining that the verification request is approved based on the verification process;

generating a verification code, the verification code including identifying information of the verification service provider and information identifying that the verification request has been approved based on a determination that the verification request is approved; and transmitting the verification code to the registrar device.

14. The computer-implemented method of claim 13, wherein the verification process includes performing a real name verification process in order to verify the registrant of the domain name.

15. The computer-implemented method of claim 13, wherein the verification process includes performing a domain verification process in order to verify the domain name.

16. The computer-implemented method of claim 13, wherein the domain name operation is a domain name registration request.

17. The computer-implemented method of claim 16, wherein the domain name operation request relates to maintenance of an existing domain name registration.

18. The computer-implemented method of claim 13, the computer-implemented method further comprising digitally signing the verification code.

* * * * *